United States Patent
Nakajima (10) Patent No.: US 8,305,646 B2
(45) Date of Patent: Nov. 6, 2012

(54) ELECTRONIC DOCUMENT PRINTING SYSTEM, PRINTING CONTROLLER, PRINTING CONTROL METHOD, AND COMPUTER-READABLE MEDIUM

(75) Inventor: Yasuo Nakajima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1453 days.

(21) Appl. No.: 11/559,573

(22) Filed: Nov. 14, 2006

(65) Prior Publication Data

US 2007/0171464 A1    Jul. 26, 2007

(30) Foreign Application Priority Data

Jan. 24, 2006  (JP) .................................. 2006-015479

(51) Int. Cl.
*H04N 1/40* (2006.01)
*H04L 9/32* (2006.01)
(52) U.S. Cl. ...................... 358/3.28; 713/176
(58) Field of Classification Search ............... 358/1.15, 358/3.28
See application file for complete search history.

(56) References Cited

U.S. PATENT DOCUMENTS

| | | | | |
|---|---|---|---|---|
| 6,628,417 B1 * | 9/2003 | Naito et al. | ...... | 358/1.15 |
| 7,027,179 B2 * | 4/2006 | Mori | ...... | 358/1.18 |
| 7,043,050 B2 * | 5/2006 | Yuval | ...... | 382/100 |
| 7,245,740 B2 * | 7/2007 | Suzaki | ...... | 382/100 |
| 2002/0154332 A1 | 10/2002 | Inai et al. | | |
| 2003/0112456 A1 * | 6/2003 | Tomita et al. | ...... | 358/1.13 |
| 2003/0165253 A1 * | 9/2003 | Simpson et al. | ...... | 382/100 |

FOREIGN PATENT DOCUMENTS

| | | |
|---|---|---|
| JP | 2002245267 | 8/2002 |
| JP | 2003108321 | 4/2003 |
| JP | 2003134327 | 5/2003 |

* cited by examiner

*Primary Examiner* — Thomas Lett
*Assistant Examiner* — Sunil Chacko
(74) *Attorney, Agent, or Firm* — Gesmer Updegrove LLP (57) ABSTRACT

There is provided an electronic document printing system comprising an electronic document generator and a print controller, the electronic document generator comprising a superimposed-image information incorporating unit that incorporates, into the electronic document data, a superimposed image and mark information for invalidating the superimposed image, and the print controller comprising: a condition storage unit that stores a condition of electronic document data in which a superimposed image is to be invalidated when the electronic document data is printed, as a condition to be satisfied by mark information included in the electronic document data; a determination unit that determines whether or not mark information included in electronic document data satisfies the condition; and a controlling unit that instructs the printing device to invalidate the superimposed image in the electronic document data and print the document image when the determination unit determines that the condition is satisfied.

5 Claims, 8 Drawing Sheets

ELECTRONIC DOCUMENT PRINTING SYSTEM, PRINTING CONTROLLER, PRINTING CONTROL METHOD, AND COMPUTER-READABLE MEDIUM

PRIORITY INFORMATION

This application claims priority to Japanese Patent Application No. 2006-015479, filed on Jan. 24, 2006.

BACKGROUND

1. Technical Field

The present invention relates to management of a printing output of an electronic document.

2. Related Art

In an environment where an electronic document is distributed to or shared by multiple users, it is now a general practice to unify the format of the electronic document in a format which can be viewed on a screen, such as PDF (Portable Document Format), and store the electronic document in that format, in order to reduce storage cost. PDF is a format developed by Adobe Systems Incorporated of the United States and has recently been standardized by ISO (International Organization for Standardization).

Because a PDF document can be electronically copied, functions for protecting the content using, for example, a password, encryption, and electronic signature are provided. In addition, there exists a system which prohibits the printing function as a matter of policy.

In order to use these security-enhancing functions, a server for authenticating the electronic signature, managing a password, or managing policy is required. In other words, when a viewer (for example, Acrobat® Reader) or editing software (for example, Acrobat®) which handles a PDF document handles a PDF document which uses the security function, there may be cases in which a desired function cannot be performed unless the viewer or the software connects to a server such as the policy server.

An electronic document such as the PDF document has an advantage in that the electronic document can be distributed to and viewed by many users, because electronically copying the electronic document is easy. Meanwhile, there are needs for managing the electronic document by limiting printing of the document with a certain limitation while allowing for freely viewing the document. As a method for managing the printing process, there is known a method in which the electronic document can be printed in its complete form only by a particular printing device which is managed.

For example, printing of business documents used in business operations needs to be limited to one time by a particular printer in which the printing output is managed while the viewing of the business documents is freely allowed. In addition, there may be cases in which the printing of the contents is limited for commercial purposes, such as a case in which a sample document is distributed in a large amount in the form of the electronic document and high-quality printing is only allowed by a particular chargeable printing device after receipt of payment.

SUMMARY

According to one aspect of the present invention, there is provided an electronic document printing system having an electronic document generator that generates electronic document data including a document image, and a print controller that receives electronic document data and instructs a printing device to print the electronic document, the electronic document generator has a superimposed-image information incorporation unit that incorporates, into the electronic document data, a superimposed image to be superimposed to the document image and mark information for invalidating the superimposed image, and the print controller has a condition storage unit that stores a condition of electronic document data in which a superimposed image is to be invalidated when the electronic document data is printed, as a condition to be satisfied by mark information included in the electronic document data; a determination unit that determines whether or not mark information included in electronic document data to be printed satisfies the condition stored in the condition storage unit; and a controlling unit that instructs the printing device to invalidate the superimposed image in the electronic document data and print the document image when the determination unit determines that the condition is satisfied and that instructs the printing device to print the document image in which the superimposed image is superimposed when the determination unit determines that the condition is not satisfied.

BRIEF DESCRIPTION OF THE DRAWINGS

Exemplary embodiment(s) of the present invention will be described in detail by reference to the following figures, wherein.

DETAILED DESCRIPTION

Figure 1:
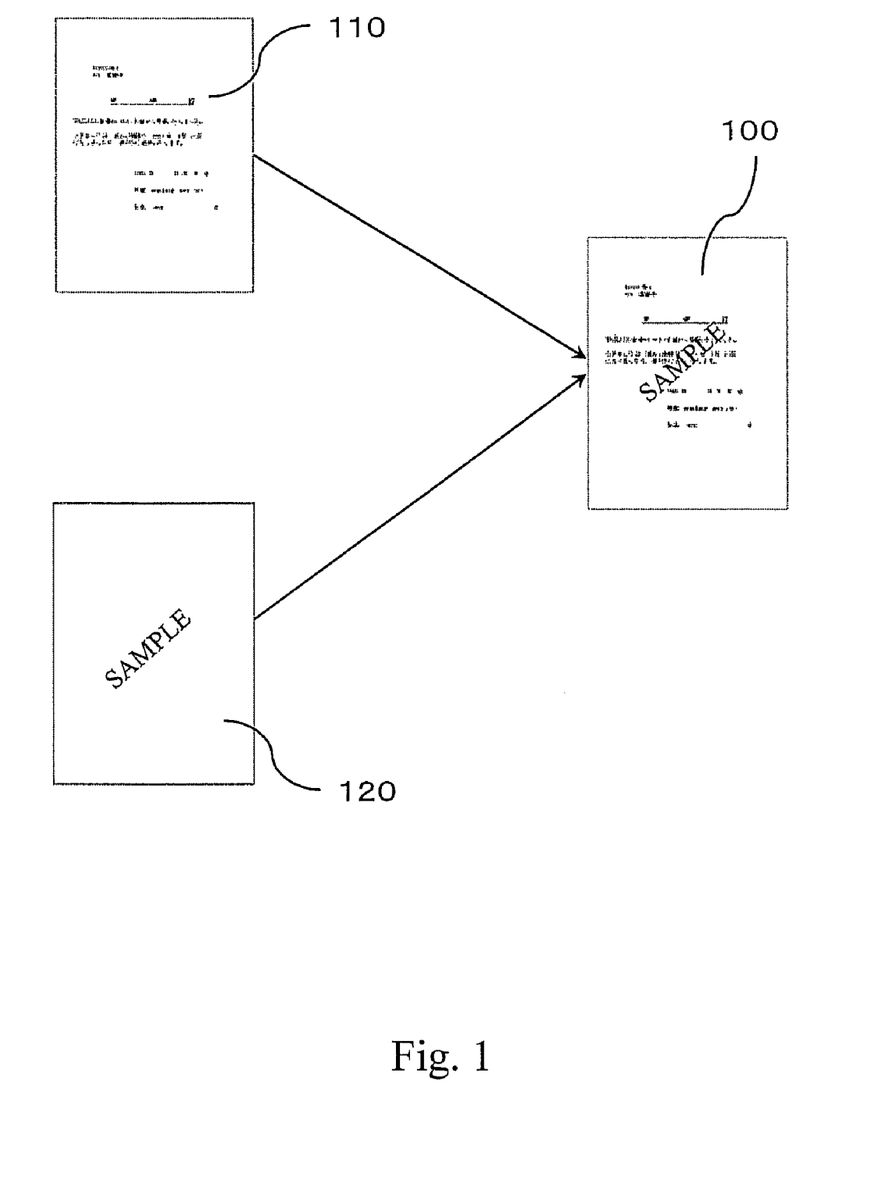
FIG. 1 is a diagram for explaining a concept of printing management of an electronic document.

Referring to FIG. 1, a concept of an electronic document printing management according to the present invention will be described. As shown in FIG. 1, in an exemplary embodiment of the present invention, background pattern image data 120 of a background pattern (or "watermark") is superimposed to document image data 110 indicating an image of a content of an original electronic document, to thereby generate an electronic document 100 for distribution. The background pattern image data 120 are data which change the document image data 110 to an image which differs from the original, by hiding or changing at least a portion of the content of the document image data 110. In the illustrated example, an image of a text string of "sample" is superimposed on the original document image data 110 as a background pattern. When the electronic document 100 for distribution is printed in a state in which the background pattern image data 120 are superimposed, the background pattern is also printed, and, thus, only a print result displaying an image differing from the original electronic document can be obtained.

For example, when PDF is used as the format of the electronic document, the background pattern image data 120 can be incorporated into the electronic document 100 as a "form". In this case, the document image data 110 are superimposed to the background pattern image data 120 which are incorporated as the form. A name of the form (form name) or an identification number (hereinafter these are referred to as "form ID") may be attached to the background pattern image data 120 embedded as the form and the form ID may be provided as attribute data in the electronic document 100. The background pattern image data 120 which are embedded as the form can be invalidated by making the background pattern image colorless or by replacing the form with another form which is transparent.

The electronic document 100 for distribution as described above is distributed to users. A user can view the electronic document 100 by means of a viewer (for example, Acrobat™).

Meanwhile, on a particular printing device, a condition of a form ID for which the background pattern image data 120 are to be invalidated for printing is stored. When an electronic document 100 having a form ID which satisfies the stored condition is input to the particular printing device, the printing device invalidates the background pattern image data 120 of the electronic document 100 to thereby print only the original document image indicated by the document image data 110. The invalidation of the background pattern image data 120 can be realized through a method such as making the background pattern image data 120 colorless (by, for example, changing the values of all pixels to a value of no color) or replacing the background pattern image data 120 with another form which has no color (or which is colorless and transparent). The condition of the invalidation of the background pattern may be, for example, matching of a form ID with a predetermined pattern such as "PUBLICFORM-???" ("?" indicates an arbitrary numeral). In addition, it is also possible to register as the condition, in the printing device, a list of form IDs for which invalidation of the background pattern is to be allowed.

Meanwhile, when an electronic document 100 having a form ID which does not match the condition stored in the printing device is input, the printing device prints an image in which the document image data 110 and the background pattern image data 120 are superimposed.

In this manner, by preventing printing and output of the original document image of the electronic document 100 in printing devices other than the particular printing device in which the form ID of the background pattern image data 120 is registered, it is possible to easily manage high-quality printing of the electronic document 100.

For example, a business document used in business operations in a company may be distributed to employees in the form of the electronic document 100 to which the form of the background pattern image data 120 is incorporated.

It is also possible to employ a configuration in which a content provider of a document image content distributes to potential customers an electronic document 100 including the background pattern image data 120 as a sample document so that viewing of the document is freely allowed by the potential customers with the background pattern, but high-quality printing of the content without the background pattern is only allowed by a printing device (for example, a multifunction device) whose use can be charged for and which is provided at a convenience store, a print shop, etc. In this case, the form ID of the background pattern image data 120 of the electronic document 100 may be registered in chargeable printing devices provided in convenience stores or the like.

In this configuration, when the form ID of the background pattern image data 120 of the electronic document 100 matches the condition registered in a printing device, the printing device prints the electronic document 100 with the background pattern image data 120 invalidated, and, when the form ID does not match the condition, the printing device prints the background pattern image data 120 along with the document image data 110, and, thus, the control is simple. As described, according to the exemplary embodiment, massive distribution of the electronic document 100 and management of printing of the original image of the electronic document 100 may be realized through simple control.

Figure 2:
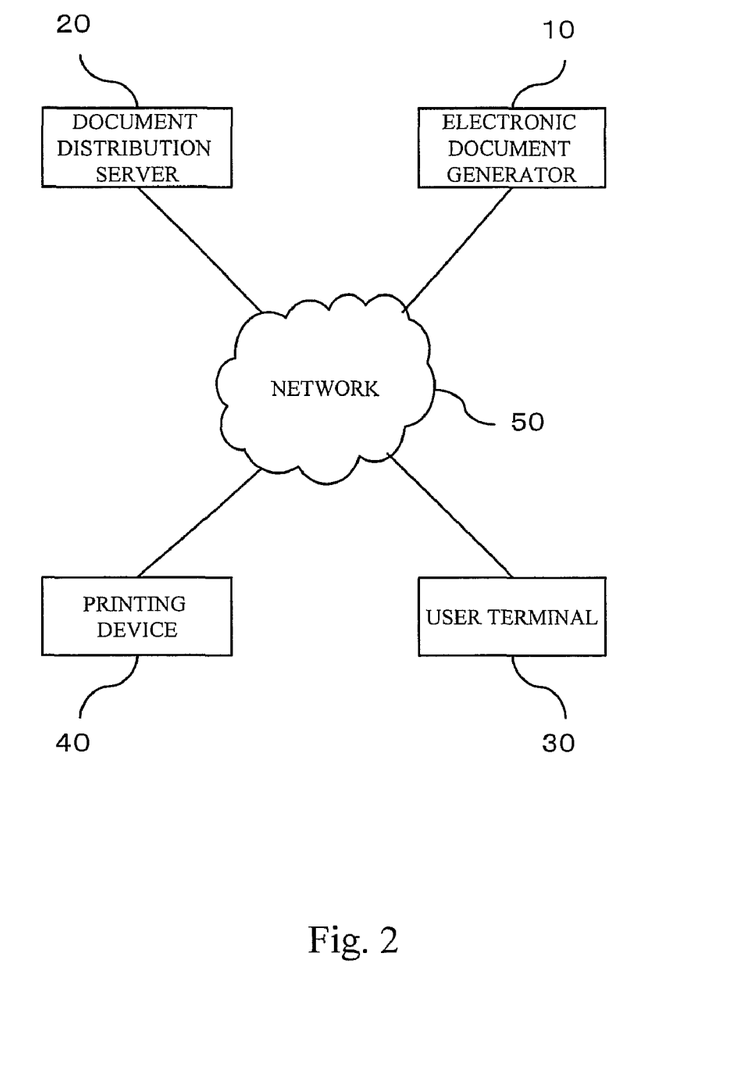
FIG. 2 is a diagram schematically showing a structure of an electronic document printing system.
Figure 3:
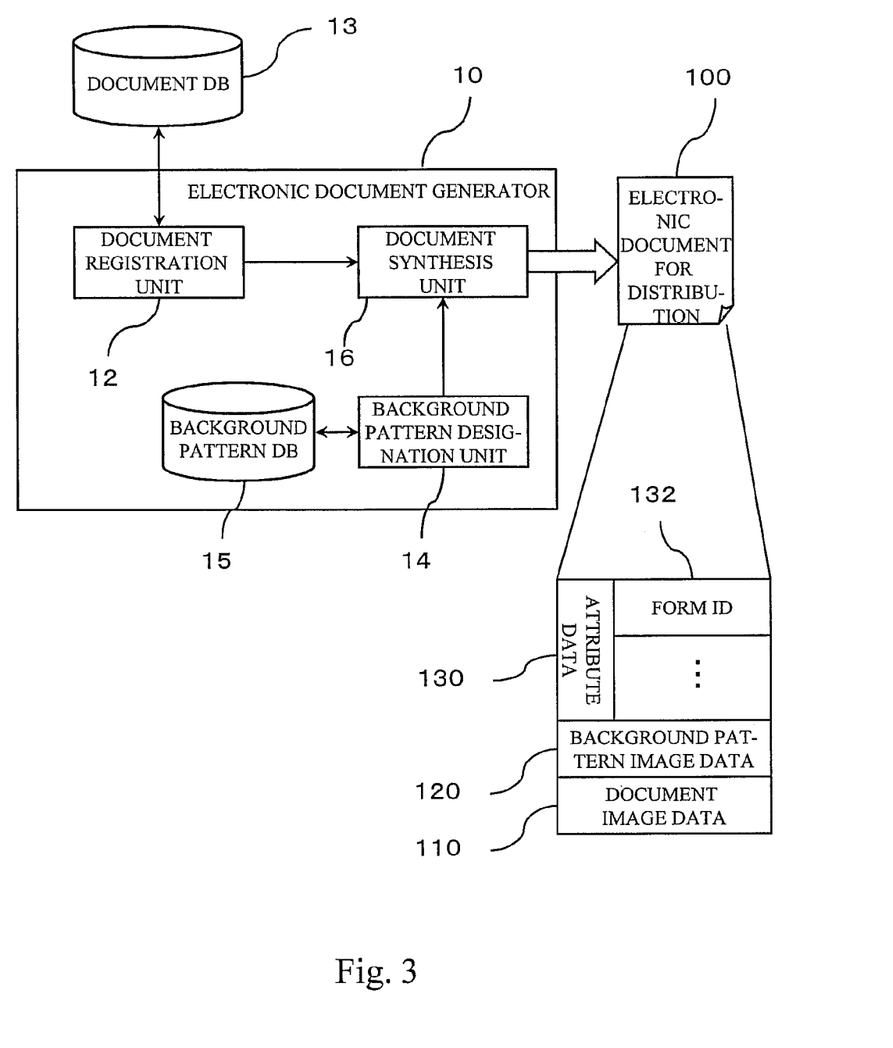
FIG. 3 is a diagram showing a structure of an electronic document generator in an exemplary embodiment of the present invention.
Figure 4:
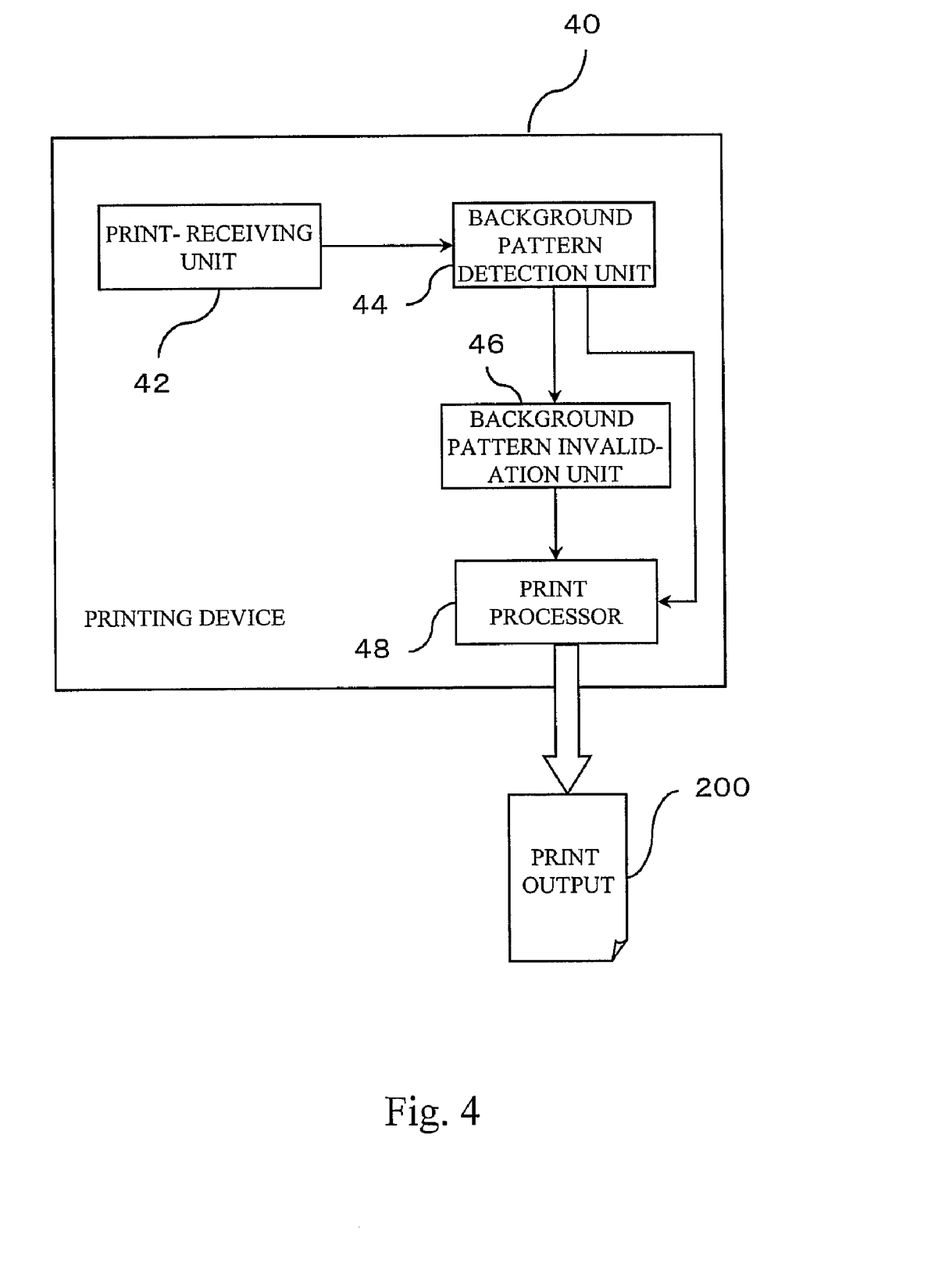
FIG. 4 is a diagram showing a structure of a printing device in an exemplary embodiment of the present invention.

Next, an example system structure for realizing this method will be described by reference to FIGS. 2-4. As shown in FIG. 2, this system has an electronic document generator 10, a document distribution server 20, a user terminal 30, and a printing device 40, which are connected to a network 50, such as the Internet or a LAN (Local Area Network). The electronic document generator 10 is a device which generates an electronic document 100 for distribution and is used by a provider who provides the electronic document 100 to users. The document distribution server 20 is a server device which executes a service of distributing the generated electronic document 100 to one or more users. The document distribution server 20 may be formed as, for example, a web server which provides a user with a list of electronic documents 100 for distribution registered by a provider of multiple electronic documents and provides the user terminal 30 with a file of an electronic document 100 for distribution registered by the user from the list. The user terminal 30 is a computer of a user who acquires and uses a file of the distributed electronic document 100. The user terminal 30 may be a computer such as a personal computer. The printing device 40 has a function of receiving an electronic document such as a PDF file without any processing (without conversion to a page description language) and print the file. In other words, the printing device 40 has a function equivalent to that of a printer driver which converts a file of a file format of the electronic document 100 into a page description language or a bitmap image which can be printed. Such a function of receiving the application file without processing and printing the file is also called "direct printing". The printing device 40 also has a function of invalidating the form of the background pattern image data 120 incorporated into the electronic document 100.

Although FIG. 2 shows only one electronic document generator 10, one document distribution server 20, one user terminal 30, and one printing device 40, the present invention is not limited to such a configuration, and multiple numbers of any of these devices may be provided on the network 50.

A structure of the electronic document generator 10 will now be described in detail by reference to FIG. 3. In the illustrated configuration, the electronic document generator 10 has a document registration unit 12, a background pattern designation unit 14, a background pattern DB (database) 15, and a document synthesis unit 16.

The document registration unit 12 provides a list of (original) electronic documents registered in a document DB 13 to a user and receives, from the user, a selection of a document to be distributed from the list. The document DB 13 is a database which stores the electronic documents and may assume the form of a file system, for example. The document DB 13 may be provided within the electronic document generator 10 or may be provided on the network so that the document DB 13 can be accessed from the electronic document generator 10.

The background pattern designation unit 14 receives a user selection from among one or more sets of background pattern image data 120 stored in the background pattern DB 15. In this process, the background pattern designation unit 14 may display, on the screen, a background pattern image or a thumbnail image of the background pattern image registered in the background pattern DB 15, to be referenced in the selection of the user.

The document synthesis unit 16 sets the background pattern image data 120 designated by the user with the background pattern designation unit 14 as a form and superimposes to the form the document image data 110 of the original electronic document selected by the user via the document registration unit 12, to thereby generate the electronic document 100 for distribution. Here, a form ID 132 of the background pattern image data 120 may be incorporated into attribute data 130 of the electronic document 100.

The form ID to be incorporated into the electronic document 100 may be registered, for example, in the background pattern DB 15 in correspondence with the background pattern image data 120. There may be cases in which multiple printing devices 40 which can invalidate the background pattern image and print the document are present in the system and the background pattern images that can be invalidated differ among the printing devices. In these cases, information indicating which background image data 120 can be invalidated by which printing device 40 may be registered in the background pattern DB 15 or the like, and, when a creator of the electronic document 100 for distribution selects the background pattern, the background pattern designation unit 14 may notify the creator which printing device 40 can invalidate the background pattern and print the document. In this case, the creator generates information for identifying a printing device 40 which can invalidate the background pattern in the electronic document 100 and print the document, and incorporates the information into the attribute data 130 of the electronic document 100 or registers the information in the document distribution server 20 as an attachment file of the electronic document 100. In this manner, the user to which the electronic document 100 is distributed can know the printing device(s) 40 which can print the electronic document 100 without the background pattern.

In the above description, there is described a configuration in which the form ID is registered in correspondence to the background pattern image data 120 in advance. Alternatively, the electronic document generator 100 may generate the form ID. In this configuration, a user who creates the electronic document may select a printing device 40 (or multiple printing devices 40) to print the electronic document 100 without the background pattern and the electronic document generator 10 may generate a form ID which satisfies a condition registered in the selected printing device 40. For example, when the selected printing device 40 employs a condition in which a form ID with "PUBLICFORM-????" (wherein "?" designates an arbitrary numeral) is determined to be the background pattern invalidation target, the electronic document generator 10 generates a form ID in which 4 digits of numerals follow the text string of "PUBLICFORM-." Here, the conditions stored in the printing devices 40 are registered in the electronic document generator 10 in advance.

The electronic document generator 10 has been described. The electronic document 100 for distribution generated by the electronic document generator 10 in this manner is registered in the document distribution server 20. A user who wishes to use the electronic document 100 can receive the electronic document 100 from the document distribution server 20. When the user desires to print the electronic document 100 without the background pattern, the user inputs the electronic document 100 in the particular printing device 40 via the network 50 or via a portable recording medium and can instruct printing of the document.

Next, a structure of the printing device 40 will be described by reference to FIG. 4. The printing device 40 has a print-receiving unit 42, a background pattern detection unit 44, and a print processor 48.

The print-receiving unit 42 receives a print instruction via the network 50. In the illustrated configuration, the print-receiving unit 42 receives an electronic document file of a predetermined data format (for example, PDF) as data to be printed. In addition to the data to be printed, the print-receiving unit 42 may receive, from the user terminal 30, attribute data such as a job ticket indicating attributes of the printing process (for example, number of copies to be printed, paper size, designation of single-sided/double-sided printing) and may set operation parameters of the printing device 40 in accordance with the attribute data.

The background pattern detection unit 44 detects the background pattern to be invalidated from the electronic document received by the print-receiving unit 42. When the electronic document does not include the form ID, or includes the form ID but the form ID does not satisfy the condition of invalidation registered in the background pattern detection unit 44 in advance, the background pattern detection unit 44 determines that there is no background pattern to be invalidated. In this case, the electronic document is transferred to the print processor 48.

When a form ID satisfying the invalidation condition is detected from the electronic document, the background pattern detection unit 44 transfers the electronic document to a background pattern invalidation unit 46. The background pattern invalidation unit 46 invalidates the form of the electronic document. In other words, the background pattern invalidation unit 46 applies an invalidation process such as making the image portion of the form (that is, the background pattern image data 120) colorless, or replacing the form with another, colorless form. With this process, the form for distribution is removed from the electronic document and only the original document image data 110 are indicated in the electronic document. The electronic document having undergone the invalidation process is then transferred to the print processor 48.

The print processor 48 has a processor which converts the electronic document into image data or data of a page description language which can be printed, and a print engine which prints an image on paper by means of the converted data. The print processor 48 has a direct printing function and processes the data of the electronic document which are not in page description language, to thereby generate image data which can be handled by the print engine. The print engine then prints the document on the basis of the resulting data.

With the printing device 40, when the electronic document received by the print-receiving unit 42 contains a background pattern which satisfies the invalidation condition, the electronic document is printed with the background pattern invalidated, and, when the electronic document contains a background pattern which does not satisfy the invalidation condition, the document is printed with the background pattern.

Figure 5:
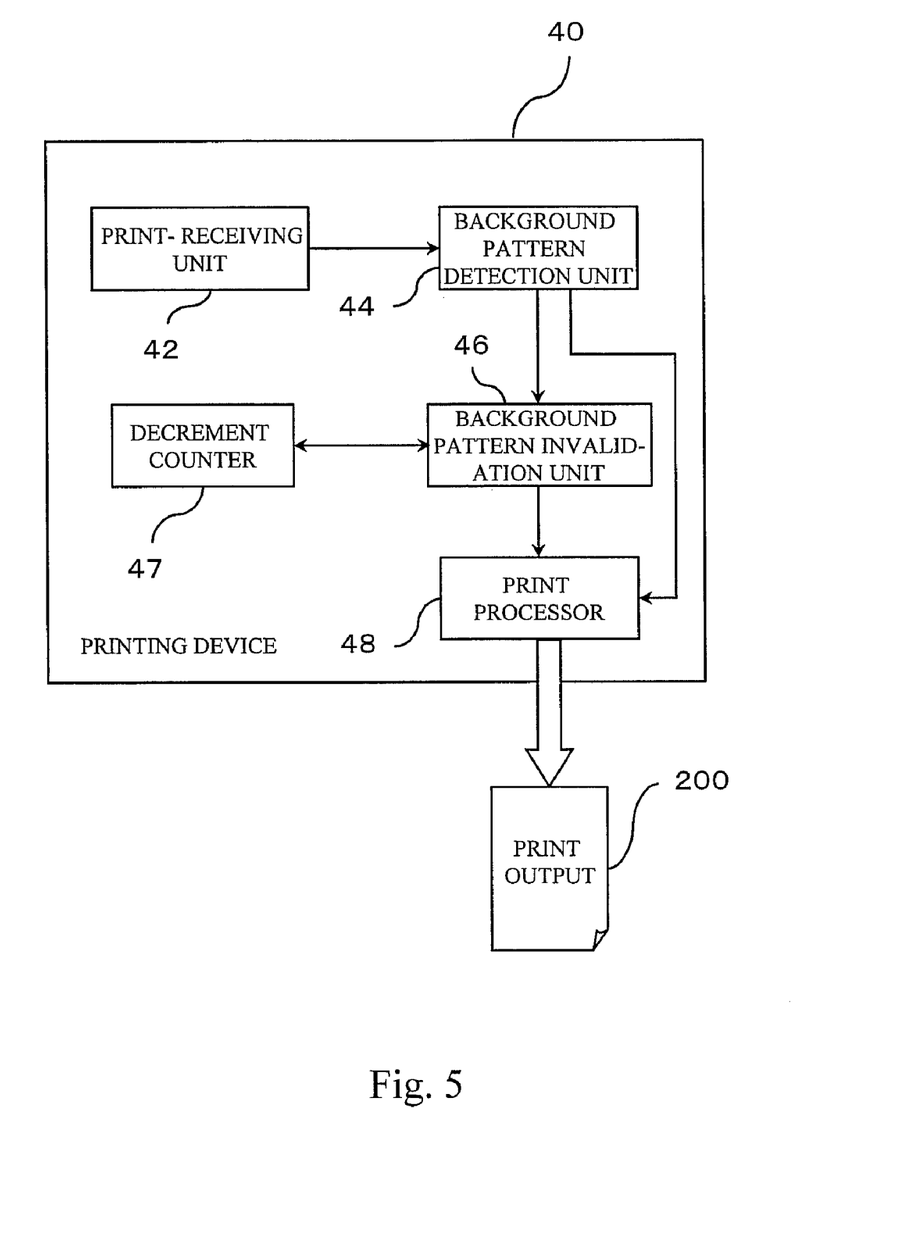
FIG. 5 is a diagram showing a structure of a printing device in an example structure in which a limitation is imposed on the number of times a background pattern is invalidated.

Next, an example configuration will be described by reference to FIG. 5 in which a limitation is imposed on the number of times the background pattern is invalidated during printing of the electronic document 100. In FIG. 5, constituent elements that are identical or similar to those of FIG. 4 are assigned the same reference numerals and their repeated descriptions are omitted.

In this example configuration, a decrement counter 47 is provided for each individual form ID. The decrement counter 47 may be generated and managed by software. When an electronic document having a certain form ID which satisfies the invalidation condition is given for the first time, the background pattern invalidation unit 46 generates a decrement counter 47 for the form ID. An initial value of the generated decrement counter 47 is set to a predetermined value, which is determined in advance in the system. Every time the form of the background pattern corresponding to the form ID is invalidated, the value of the decrement counter 47 corresponding to the form ID is decremented by 1. Even when the form ID of the input electronic document satisfies the invalidation condition of the background pattern, if the value of the corresponding decrement counter 47 is 0, the form of the background pattern of the electronic document is not invalidated.

Figure 6:
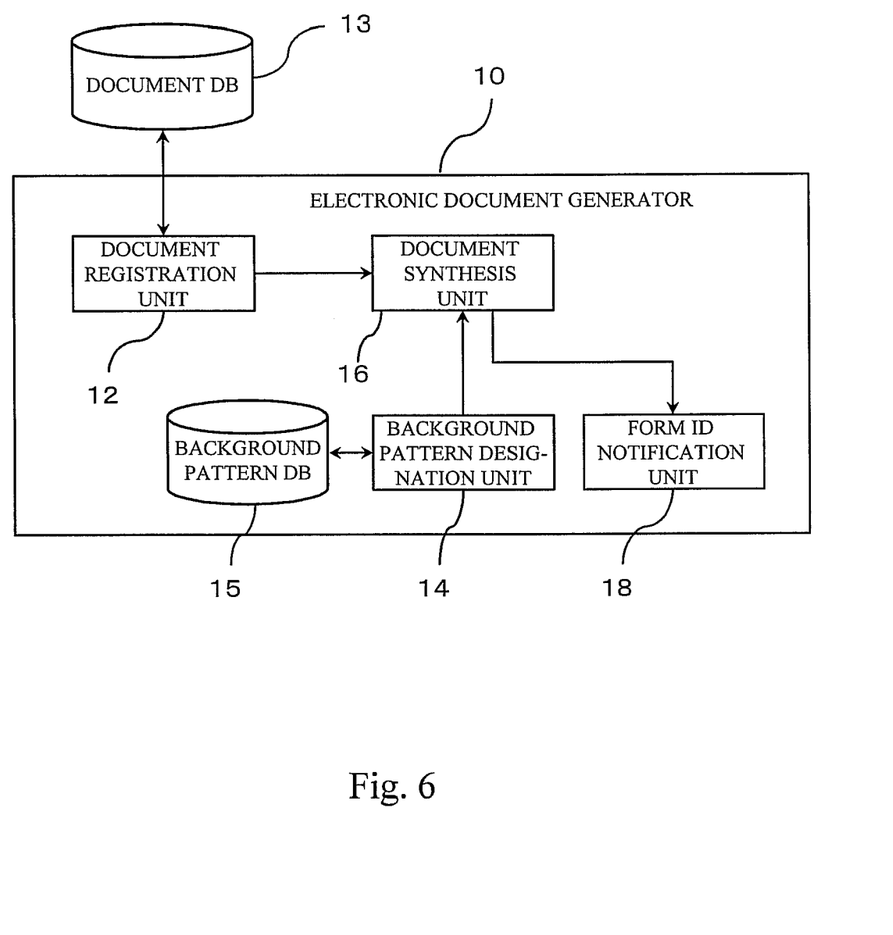
FIG. 6 is a diagram showing a structure of an electronic document generator according to another exemplary embodiment of the present invention.
Figure 7:
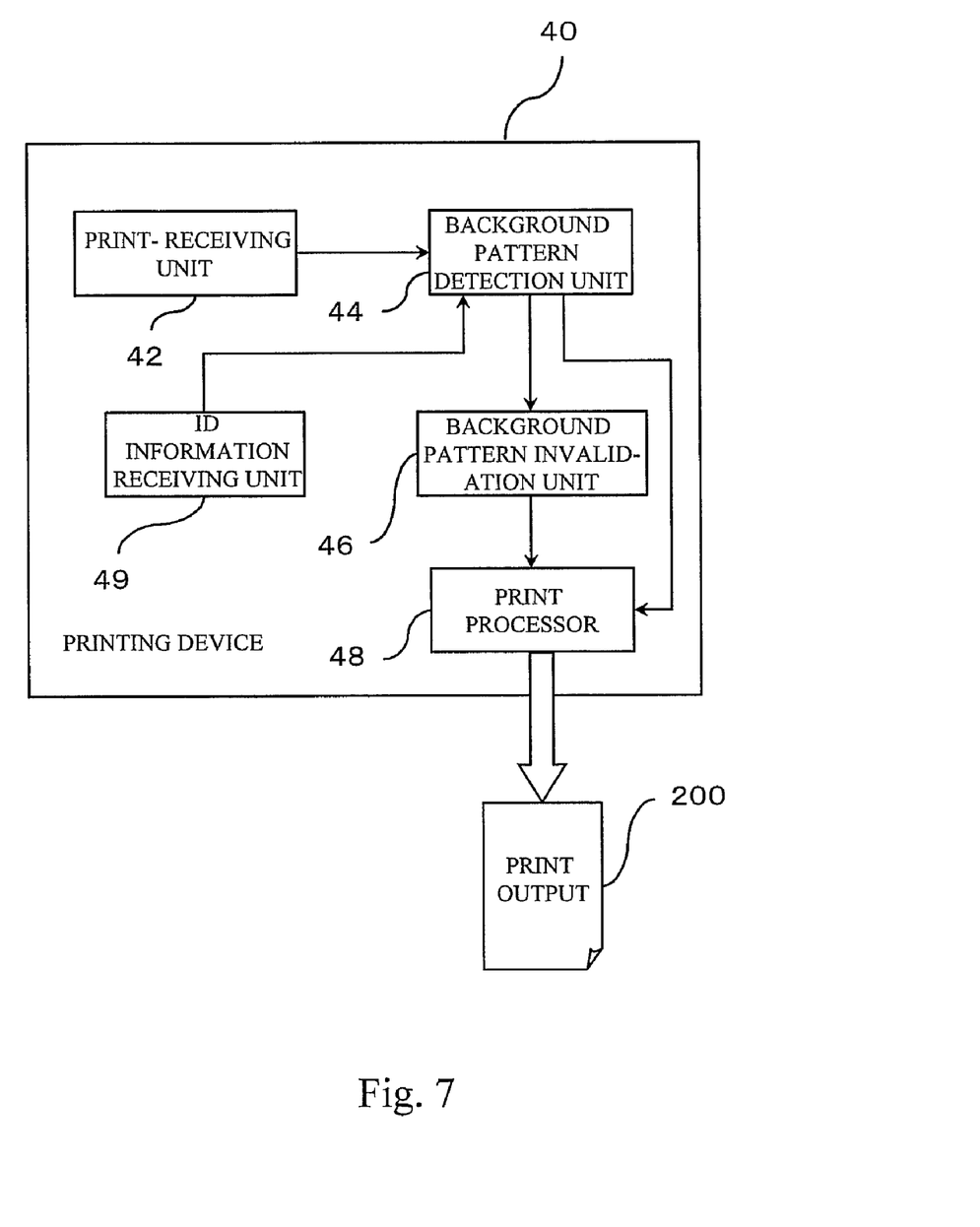
FIG. 7 is a diagram showing a structure of a printing device according to another exemplary embodiment of the present invention.

Next, a system of an alternative configuration will be described by reference to FIGS. 6 and 7. In FIGS. 6 and 7, those constituent elements identical or similar to those of FIGS. 3 and 4 are assigned the same reference numerals and their repeated descriptions are omitted.

In this alternative configuration, the electronic document generator 10 generates the form ID of the background pattern image data 120 and registers the form ID in the printing device 40 as a condition for determining invalidation of the background pattern. The printing device 40 invalidates a form in an input electronic document when the form ID of the input electronic document is contained in a list of form IDs registered as the condition for determining invalidation of the background pattern.

In the electronic document generator 10 in the alternative configuration, when the document synthesis unit 16 incorporates the background pattern image data 120 designated by the background pattern designation unit 14 to the original document image data 110 as a form, the form ID of the form is generated. Then, the generated form ID is notified by a form ID notification unit 18 to a particular printing device 40 (or multiple particular printing devices 40). Here, the printing device 40 to which the form ID is to be notified may be a fixed printing device which is registered in the electronic document generator 10, or, alternatively, may be dynamically designated or selected by a person instructing the generation of the electronic document.

In the printing device 40, an ID information receiving unit 49 receives the form ID notified from the electronic document generator 10 and stores the form ID in the background pattern detection unit 44 as a condition for invalidation determination. The background pattern detection unit 44 checks whether or not the form ID of the electronic document received by the print-receiving unit 42 is contained in a list of form IDs which are registered as conditions. When the form ID is registered as a condition, the background pattern invalidation unit 46 invalidates the form (background pattern) of the electronic document. In contrast, when the form ID is not registered, the electronic document is printed without the background pattern being invalidated.

When the form ID is notified from the electronic document generator 10 to the printing device 40, the form ID may be protected through, for example, encryption.

In this alternative configuration, it is also possible to employ a configuration in which the person instructing the generation of the electronic document for distribution inputs, to the electronic document generator 10, a numerical upper limit for invalidating the background pattern of the electronic document and the input upper limit is notified and registered as an initial value of the decrement counter 47 from the electronic document generator 10 to the printing device 40. This notification process may be executed during notification of the form ID.

The method of the exemplary embodiment and the alternative configuration described above may be applied to a system structure which uses two different devices including a print server (or print controller) and a printer (print engine), in place of a printing device 40. In this case, the print server has the functions, among the functions of the print-receiving unit 42, the background pattern detection unit 44, the background pattern invalidation unit 46, and the process processor 48, corresponding to the portion for converting the data of the electronic document or page description language into image data that can be printed. The image data generated by the print server are input to the printer via a dedicated cable or a network and are used for printing.

In the above-described example configuration, incorporation of the background pattern image data 120 into the electronic document as a form is a function of the electronic document generator 10, but the present invention is not limited to such a configuration; the function may alternatively be provided in the document distribution server 20. This configuration can be considered as a case in which the document distribution server 20 functions as a device for generating the electronic document for distribution.

Alternatively, it is also possible to employ a configuration in which the document distribution server 20 attaches the form ID of the background pattern image data 120 of the electronic document 100 for distribution. In this case, the electronic document generator 10 generates the electronic document for distribution in which the background pattern image is incorporated into the document image data 110 as a form, but does not generate the form ID. The document distribution server 20 may notify and register the generated form ID to the printing device 40 which is the outputting device. In this method, the outputting printing device 40 which invalidates the background pattern and outputs the electronic document may be designated, in the document distribution server 20, by the user who acquires the electronic document. For example, the document distribution server 20 may allow invalidation of the background pattern by a user who has already paid and notify the form ID of the background pattern to the printing device 40 designated by the user. In this case, the user can obtain the printed result of the electronic document having no background pattern in the printing device 40. This configuration also can be considered to be a case in which the document distribution server 20 functions as a device for generating the electronic document for distribution.

It is also possible to employ a configuration, in the configuration in which the electronic document generator 10 generates the form ID, in which the form ID is registered in the printing device 40 not by the electronic document generator 10, but by the document distribution server 20. In this case also, the user who acquires the electronic document can designate, in the document distribution server 20, the outputting printing device 40 of the electronic document in which the background pattern is invalidated.

In the above-described configuration, the printing device 40 determines whether or not the background pattern of the electronic document is to be invalidated, on the basis on the form ID of the form of the background pattern image incorporated into the electronic document, but the use of form Ids is not necessarily required. Mark information which is determined between the electronic document generator 10 (or document distribution server 20) and the printing device 40 independent of the form may be used in place of the form ID. In this case, for example, a condition to be satisfied by the mark information for invalidation of the background pattern may be registered in the printing device 40, and the electronic document generator 10 (or document distribution server 20) may incorporate, into the attribute data of the electronic document 100, mark information that satisfies the condition of the printing device 40 selected as an outputting device. As another method, it is also possible to employ a configuration in which the electronic document generator 10 (or document distribution server 20) automatically generates the mark information, incorporates the mark information into the attribute data of the electronic document 100, provides the mark information to the printing device 40, and registers the mark information in the printing device 40.

In the above description, a case is described in which PDF is used as the format of the electronic document, but the present invention is not limited to such a configuration, and can be applied to formats other than PDF, so long as the format allows storage, in a separated form, of the document image data 110 and the background pattern image data 120 which are superimposed to each other, allows storage of the identification information of the background pattern image data 120, and allows selective invalidation of only the background pattern image data 120 (making colorless, replacing with another, transparent form, etc.).

In the above description, there is described an example configuration in which the electronic document is protected by superimposing a background pattern to the document image, but the present invention is not limited to such a configuration, and may be applied to a configuration in which the electronic document is protected by superimposing a blocking image for partially blocking the document image.

Figure 8:
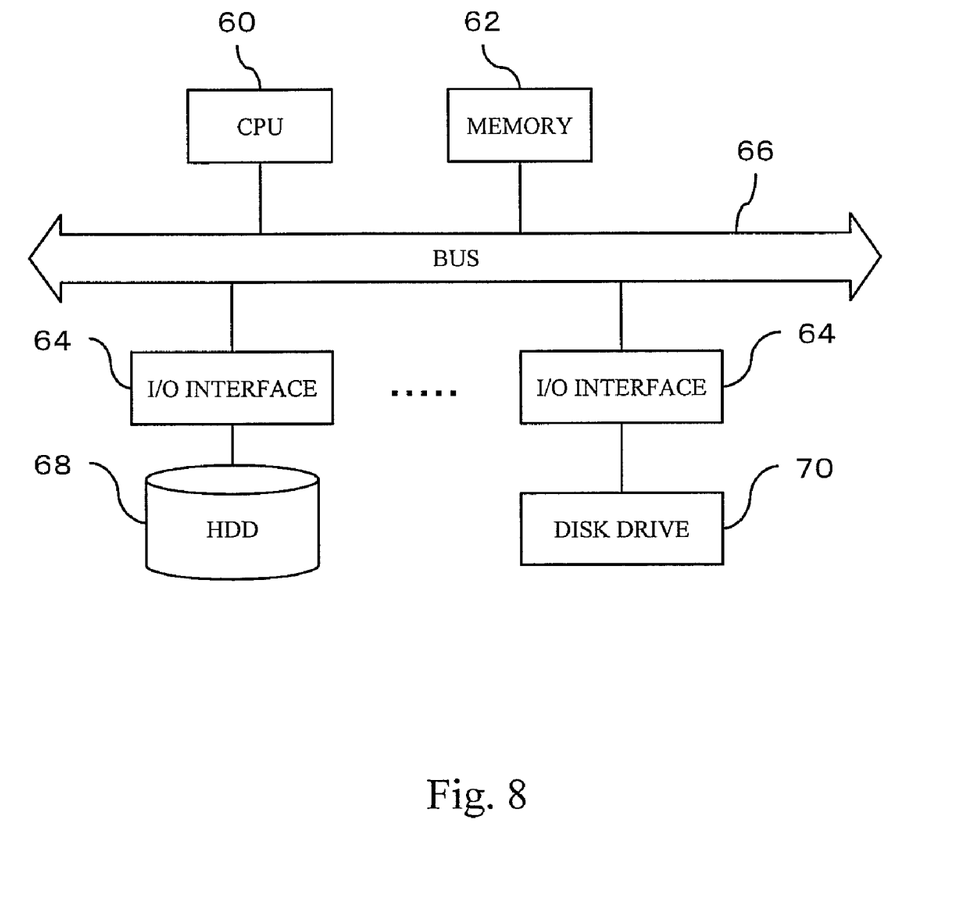
FIG. 8 is a diagram showing an example hardware structure of a general-purpose computer in which the electronic document generator is realized.

The above-described electronic document generator 10 is typically realized by executing a program describing the function or process of each element described above on a general-purpose computer. As shown in FIG. 8, the computer has, as hardware, a circuit structure in which a CPU (Central Processor Unit) 60, memory (primary storage) 62, and various I/O (input/output) interfaces 64, or the like, are connected via a bus 66. A hard disk drive 68 or a disk drive 70 for reading transportable, nonvolatile recording media of various standards such as a CD, a DVD, or a flash memory may be connected, for example, via the I/O interfaces 64 to the bus 66. Such drives 68 and 70 function as external storage devices for the memory. A program in which the processes of the electronic document generator 10 of the exemplary embodiment are described is stored in a fixed storage device such as the hard disk drive 68 via a recording medium such as a CD or DVD or via the network and is installed in the computer. The processes of the exemplary embodiment are realized by the program stored in the fixed storage device being read into the memory and executed by the CPU. In addition, similarly, the control mechanism of the printing device 40 (the print-receiving unit 42, the background pattern detection unit 44, the background pattern invalidation unit 46, etc.) or the print server can be realized by an architecture similar to that of the general-purpose computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with various modifications as are suited to the particular use contemplated. It is intended that the scope of the invention be defined by the following claims and their equivalents.

What is claimed is:

1. An electronic document printing system comprising:
an electronic document generator that generates electronic document data including a document image; and
a print controller that receives electronic document data and instructs a printing device to print the electronic document;
said electronic document generator including,
a storage unit that stores a superimposed image, identification information for the superimposed image,
a designation unit that designates a superimposed image to be incorporated into the document image from among superimposed images stored in the storage unit, and
a superimposed-image information incorporating unit that incorporates, into the electronic document data, the superimposed image designated by said designation unit and identification information for the superimposed image;
said print controller including,
a condition storage unit that stores the identification information of the superimposed image to be invalidated when the electronic document data is printed,
a determination unit that determines if the identification information included in the electronic document data to be printed matches the identification information stored in said condition storage unit, and
a controlling unit that instructs the printing device to invalidate the superimposed image in the electronic document data and print the document image when said determination unit determines that the identification information match;
said controlling unit instructing the printing device to print the document image in which the superimposed image is superimposed when said determination unit determines that the identification information do not match;
said designation unit notifying a user, when a user selects the superimposed image, information indicating a printing device which can invalidate the superimposed image.

2. The electronic document printing system according to claim 1, wherein said electronic document generator includes a unit that provides the identification information of a superimposed image incorporated into the electronic document data to a printing device which allows print output of the electronic document data; and
said condition storage unit stores the identification information of the superimposed image provided from said electronic document generator as the identification information of the superimposed image to be invalidated when the electronic document data is printed.

3. The electronic document printing system according to claim 1, wherein said controlling unit of said print controller counts the number of times the superimposed image of identification information for each set of identification information of the superimposed image is invalidated, and the superimposed image is not invalidated after the counted number reaches a preset number, even when the identification information satisfies the condition.

4. The electronic document printing system according to claim 1, wherein said superimposed-image information incorporating unit further incorporates, into the electronic document data, information of a printing device which can invalidate the superimposed image.

5. A method of electronic document printing, comprising:
generating electronic document data including a document image;
receiving the generated electronic document data and instructing a printing device to print the electronic document; and
said generating of electronic document data including,
  storing a superimposed image, identification information for the superimposed image,
  designating a superimposed image to be incorporated into the document image from among stored superimposed images, and
  incorporating, into the electronic document data, the designated superimposed image and identification information for the superimposed image;
said receiving of the generated electronic document data and instructing of a printing device to print the electronic document including,
  storing the identification information of the superimposed image to be invalidated when the electronic document data is printed,
  determining if the identification information included in the electronic document data to be printed matches the stored identification information stored,
  instructing the printing device to invalidate the superimposed image in the electronic document data and print the document image when it is determined that the identification information matches, and
  instructing the printing device to print the document image in which the superimposed image is superimposed when it is determined that the identification information does not match;
notifying a user, when a user selects the superimposed image, information indicating a printing device which can invalidate the superimposed image.

* * * * *